United States Patent
Barcelo et al.

(10) Patent No.: US 8,079,637 B2
(45) Date of Patent: Dec. 20, 2011

(54) EXTERNAL GRILLE DEVICE FOR AUTOMOTIVE VEHICLE

(75) Inventors: Franck Barcelo, Le Perray en Yvelines (FR); Guy Bettray, Guyancourt (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/526,963

(22) PCT Filed: Feb. 13, 2008

(86) PCT No.: PCT/FR2008/050228
§ 371 (c)(1),
(2), (4) Date: Jan. 21, 2010

(87) PCT Pub. No.: WO2008/104706
PCT Pub. Date: Sep. 4, 2008

(65) Prior Publication Data
US 2010/0127535 A1    May 27, 2010

(30) Foreign Application Priority Data
Feb. 15, 2007   (FR) ..................................... 07 53274

(51) Int. Cl.
*B60H 1/28* (2006.01)

(52) U.S. Cl. ........................................ 296/192; 454/146
(58) Field of Classification Search ................... 296/192
See application file for complete search history.

(56) References Cited

U.S. PATENT DOCUMENTS

| | | | |
|---|---|---|---|
| 3,285,321 A | | 11/1966 | Johnson et al. |
| 4,909,566 A | * | 3/1990 | Hashimoto et al. ........... 296/192 |
| 5,221,231 A | | 6/1993 | Jeckel |
| 5,230,547 A | * | 7/1993 | Koukal et al. ................. 296/192 |
| 5,681,075 A | | 10/1997 | Komori et al. |
| 5,692,953 A | * | 12/1997 | Bell et al. ..................... 296/192 |
| 5,887,672 A | | 3/1999 | Kimura |
| 6,224,143 B1 | | 5/2001 | Koulchar et al. |
| 6,228,152 B1 | | 5/2001 | Guerin et al. |

FOREIGN PATENT DOCUMENTS

| | | |
|---|---|---|
| DE | 43 22 951 | 8/1994 |
| DE | 198 22 197 | 12/1999 |
| EP | 1 637 372 | 3/2006 |
| FR | 2 670 717 | 6/1992 |
| FR | 2 772 670 | 6/1999 |

* cited by examiner

*Primary Examiner* — Joseph Pape
(74) *Attorney, Agent, or Firm* — Oblon, Spivak, McClelland, Maier & Neustadt, L.L.P.

(57) ABSTRACT

An external grid device for an automotive vehicle, including a flexible plastic sieve, and a meshing that is thinner than that of the grid, provided along an internal face of the grid.

7 Claims, 2 Drawing Sheets

EXTERNAL GRILLE DEVICE FOR AUTOMOTIVE VEHICLE

BACKGROUND

The invention relates to an external grille device for an automotive vehicle.

On an automotive vehicle, the external grilles, such as the scuttle grilles more especially, have the disadvantage of letting through external objects such as leaves. These can block the grilles, thereby limiting their intrinsic qualities, but they can also cause contamination or even damage to areas behind the grilles.

In the case of a scuttle grille, it is possible to use an additional stainless-steel grille which fits underneath the first grille.

However, there are many drawbacks to this type of additional grille, especially the cost, weight and thickness, which are all considerable.

BRIEF SUMMARY

In order to limit these drawbacks, the subject of the invention is an external grille device for an automotive vehicle that is simple to manufacture and inexpensive.

The invention also relates to an external grille device for an automotive vehicle that is of low weight and compact.

To this end, the invention provides an external grille device for an automotive vehicle of the type indicated above, characterized in that a flexible plastic screen whose holes are smaller than those of the grille is placed adjacent to an inside face of said grille.

Other features of the invention are as follows:
- the inside face of the grille has a network of ribs forming a region for attaching together said grille and the screen
- the screen is attached to the grille by welding
- the dimensions of the holes in the screen are between 2 and 7 millimeters
- the screen is made of polypropylene
- the external grille is a scuttle grille located between a hood and a windshield of the vehicle, the screen being located between the grille and a water tank situated underneath said grille
- the external grille is a forward air intake grille
- the external grille is a side intake grille.

BRIEF DESCRIPTION OF THE DRAWINGS

Other features and advantages of the invention will become apparent on reading the description of various illustrative embodiments of a grille device for an automotive vehicle with reference to the appended drawings, in which.

DETAILED DESCRIPTION

In the following description the longitudinal, vertical and transverse orientations will, without implied limitation, be as indicated by the L, V, T symbols in FIGS. 1 to 4.

Figure 1:
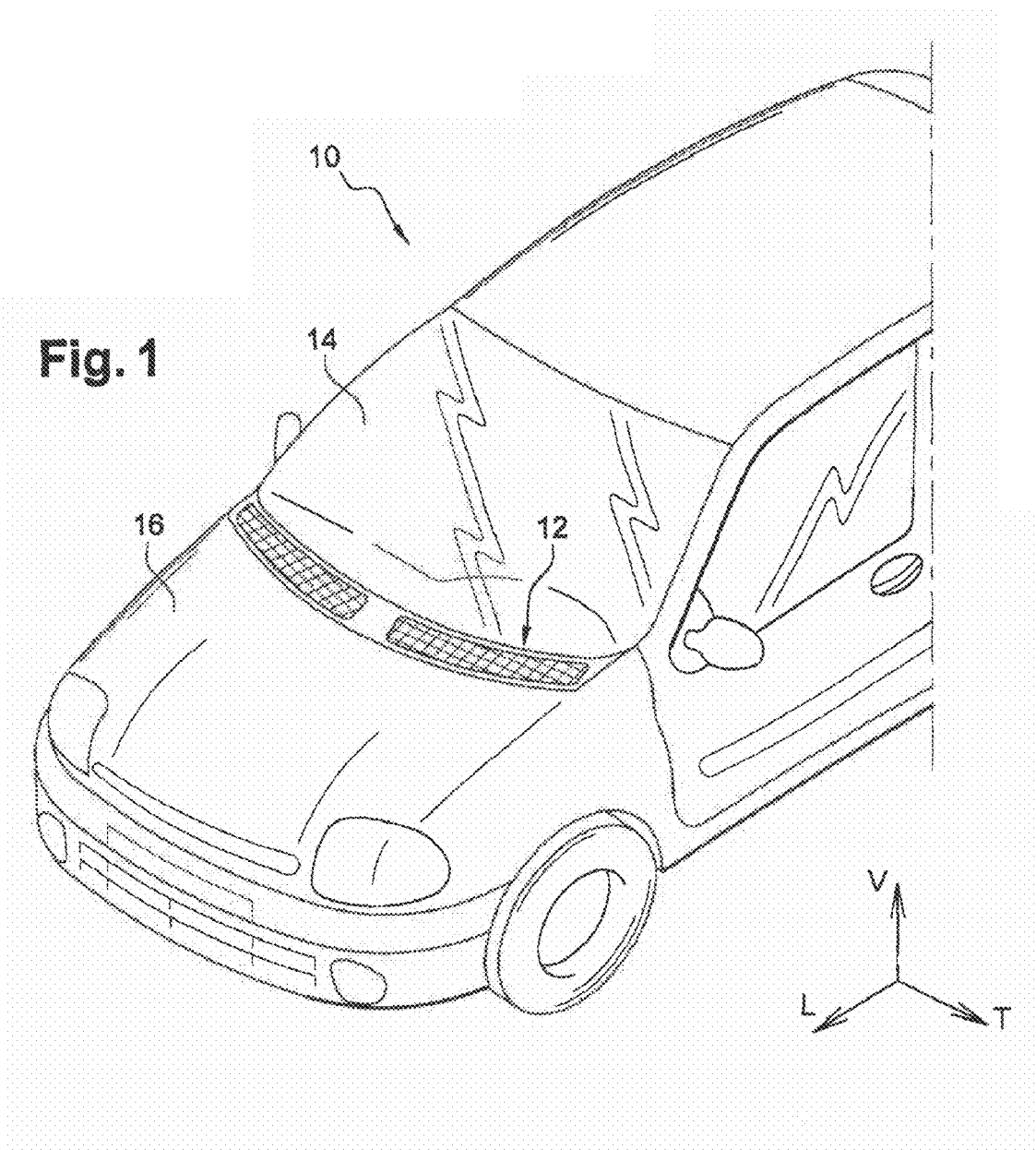
FIG. 1 is a perspective view of a vehicle comprising a grille device according to the invention

As shown in FIG. 1, a vehicle 10 comprises an external grille 12.

In the example described here, the grille 12 is a plastic component extending in a transverse direction between a windshield 14 and a hood 16 belonging to the vehicle 10 and covering a water tank (not shown) for said vehicle 10. This type of grille is often called a "scuttle grille" and is designed to let air into the vehicle.

Figure 2:
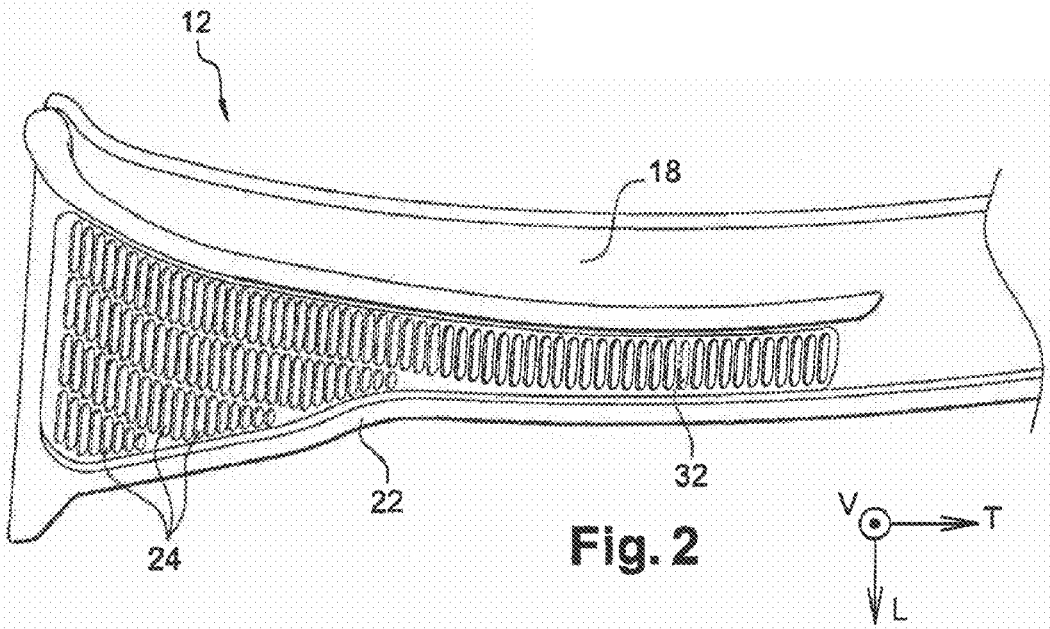
FIG. 2 is a top view of a detail of the grille alone

As shown in FIG. 2, the grille 12 has an outside face 18 facing away from the vehicle 10 and an inside face 20 facing into the vehicle 10.

The grille 12 has a perimeter 22 designed to be attached to components (not shown) of the vehicle 10 by screws or clips, for example.

The grille 12 has an array of oblong holes 24 of approximately longitudinal orientation aligned with each other. The size of the oblong holes 24 may be for example from 5 millimeters to 20 millimeters. The size of the holes 24 depends on the appearance which it is wished to give the grille, but it also depends on constraints relating to the desired air flow for ventilating the passenger compartment.

Figure 4:
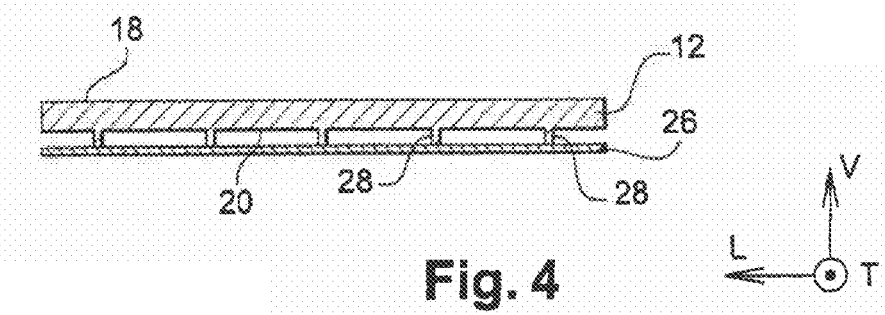
FIG. 4 is a schematic cross section taken in the direction IV-IV as marked in FIG. 3 through the complete grille device.
Figure 3:
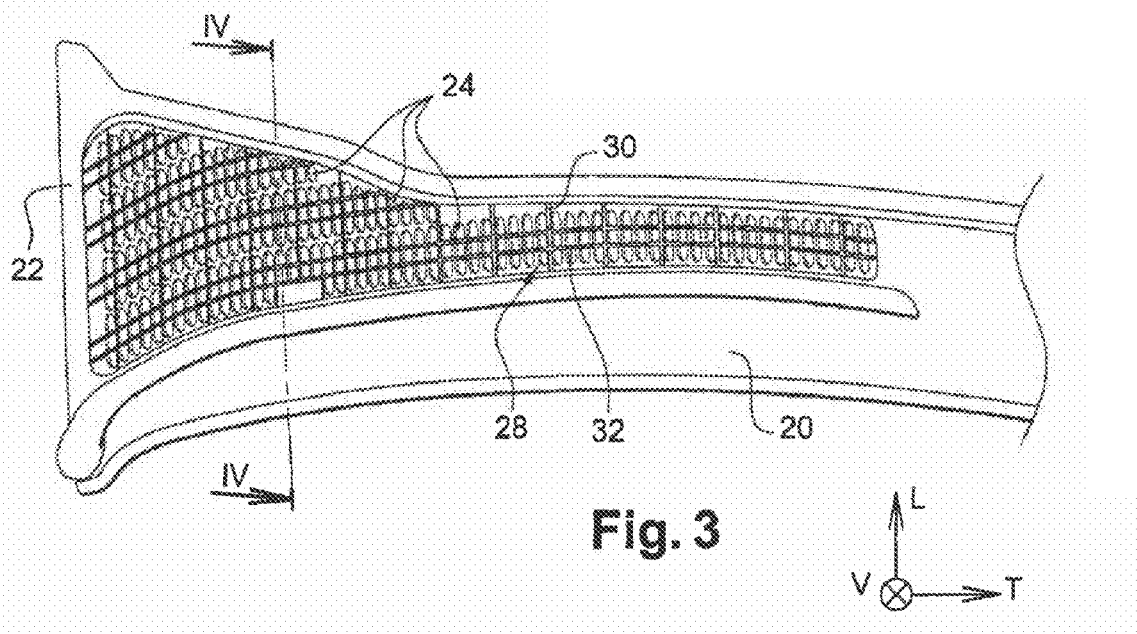
FIG. 3 is a bottom view of the detail seen in FIG. 2

As FIG. 4 shows, the grille 12 is also provided with a screen 26 (for clarity of the figures, the screen 26 has not been shown in FIGS. 2 and 3).

The screen 26 is a component made of a flexible plastic such as polypropylene. The screen 26 is cut to the shape of the grille 12 and is designed to be fixed to the inside face 20 of said grille 12.

The inside face 20 of the grille 12 has a network of ribs 28 forming regions for attaching the screen 26. Said ribs 28 are arranged in the case described here in a grid of generally longitudinal lines 30 and generally transverse lines 32. The longitudinal lines 30 are arranged between two rows of oblong holes 24 while the transverse lines 32 run through the oblong holes and are visible through the grille 12 from the outside of the vehicle.

However, the positioning of the ribs 28 on the inside face 20 of the grille 12 could be different because it depends on the configuration of the grille 12, and in particular on the shape of the holes 24, the ribs 28 also serving to stiffen the open regions.

The screen 26 can thus be welded to the ribs 28.

In a variant of the invention, the screen 26 can also be clipped to the grille 12.

The screen 26 has smaller holes than the grille 12, of around 5 to 7 millimeters, for example, which will stop outside objects getting through said grille 12, while still allowing a sufficient and correct influx of air. Hence the airflow through the screen 26 must not be less than through the grille 12. More specifically, the size of the holes of the screen 26 can be chosen to block objects that must not pass through the grille. For example, holes measuring 2 millimeters by 2 millimeters will stop mosquitoes.

The screen 26 may also undergo a surface treatment to increase its weather resistance, U.V. resistance and ageing resistance.

A first advantage of the invention is that the material of the screen 26 is simple and inexpensive to work.

Also, since the shaped material of the screen 26 is delivered in the form of rolls, the grille device of the invention has the advantage of reducing manufacturing costs by requiring less storage space.

The cutting of the screen 26 to the shape of the grille 12 is moreover simple and inexpensive, and cut screens 26 take up little storage space. All of this helps to further reduce the manufacturing and logistical costs.

The grille device of the invention has the further advantage of being easily transferred to a whole range of vehicles, because it is easily adaptable to vehicles of different types without significant tooling changes.

The grille device of the invention is also thin and low-weight. Furthermore, the use of a plastic screen of this kind improves the airflow through the grille 12 compared with the use of a stainless-steel screen.

In the case described here, the grille 12 is a scuttle grille, but it could be some other type of external vehicle grille, such as a front air intake (central grille), a side air intake, or a low-level rear air intake.

The invention claimed is:

1. A scuttle grille device for an automotive vehicle, comprising:
   an external grill including a plurality of holes; and
   a flexible plastic screen including holes that are smaller than the plurality of holes of the external grille, an inside face of the external grille including a network of ribs extending outward from the inside face of the external grille and the flexible plastic screen is welded directly to the network of ribs on the inside face of the external grille,
   wherein dimensions of the holes in the screen are between 2 and 7 millimeters.

2. The scuttle grille device as claimed in claim 1, wherein the screen is made of polypropylene.

3. The scuttle grille device as claimed in claim 1, wherein the external grille is made of plastic.

4. The scuttle grille device as claimed in claim 1, wherein each of the plurality of holes of the external grille is oblong.

5. The scuttle grille device as claimed in claim 1, wherein the external grill includes a perimeter to attach to the vehicle and the plurality of holes are positioned within the perimeter, and
   the flexible plastic screen is adjacent to the inside face of the perimeter of the external grill.

6. A scuttle grille device for an automotive vehicle, comprising:
   an external grill including a perimeter to attach to the vehicle and a plurality of holes positioned within the perimeter; and
   a flexible plastic screen adjacent to an inside face of the perimeter of the external grill, the flexible plastic screen including holes that are smaller than the plurality of holes of the external grille,
   wherein an inside face of the external grille includes a network of ribs extending outward from the external grille and the flexible plastic screen is attached directly to the network of ribs on the inside face of the external grille.

7. The scuttle grille device as claimed in claim 6, wherein dimensions of the holes in the screen are between 2 and 7 millimeters.

* * * * *